United States Patent [19]
Sato et al.

[11] Patent Number: 5,898,163
[45] Date of Patent: *Apr. 27, 1999

[54] OPTICAL CODE READER AND PROCESS FOR READING OPTICAL CODES

[75] Inventors: Shinichi Sato; Motohiko Itoh; Mitsuo Watanabe; Ichiro Shinoda; Isao Iwaguchi; Hiroaki Kawai, all of Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/718,891

[22] Filed: Sep. 24, 1996

[30] Foreign Application Priority Data

Feb. 7, 1996 [JP] Japan .................................. 8-021071

[51] Int. Cl.$^6$ ................................................ G06K 7/10
[52] U.S. Cl. ................................... 235/472; 235/462
[58] Field of Search .................................. 235/462, 472

[56] References Cited

U.S. PATENT DOCUMENTS

| | | |
|---|---|---|
| 4,354,101 | 10/1982 | Hester et al. ............................ 235/472 |
| 5,451,761 | 9/1995 | Kawai et al. . |
| 5,569,900 | 10/1996 | Blohbaum . |
| 5,589,680 | 12/1996 | Swartz et al. . |
| 5,686,717 | 11/1997 | Knowles et al. . |

FOREIGN PATENT DOCUMENTS 2 278 217   11/1994   United Kingdom .

*Primary Examiner*—Harold Pitts
*Attorney, Agent, or Firm*—Staas & Halsey

[57] ABSTRACT

A process for reading optical codes includes reading an optical code by irradiating a scan ing beam onto an optical code and detecting a reflected beam of the scanning beam from the optical code. A determination is made if the optical code and an optical code reader are moving relative to each other, and data of the optical code are invalidated if it is determined that the optical code and the optical code reader are moving relative to each other, and data of the optical code are validated if it is determined the optical code and the optical code reader are not moving relative to each other.

35 Claims, 15 Drawing Sheets

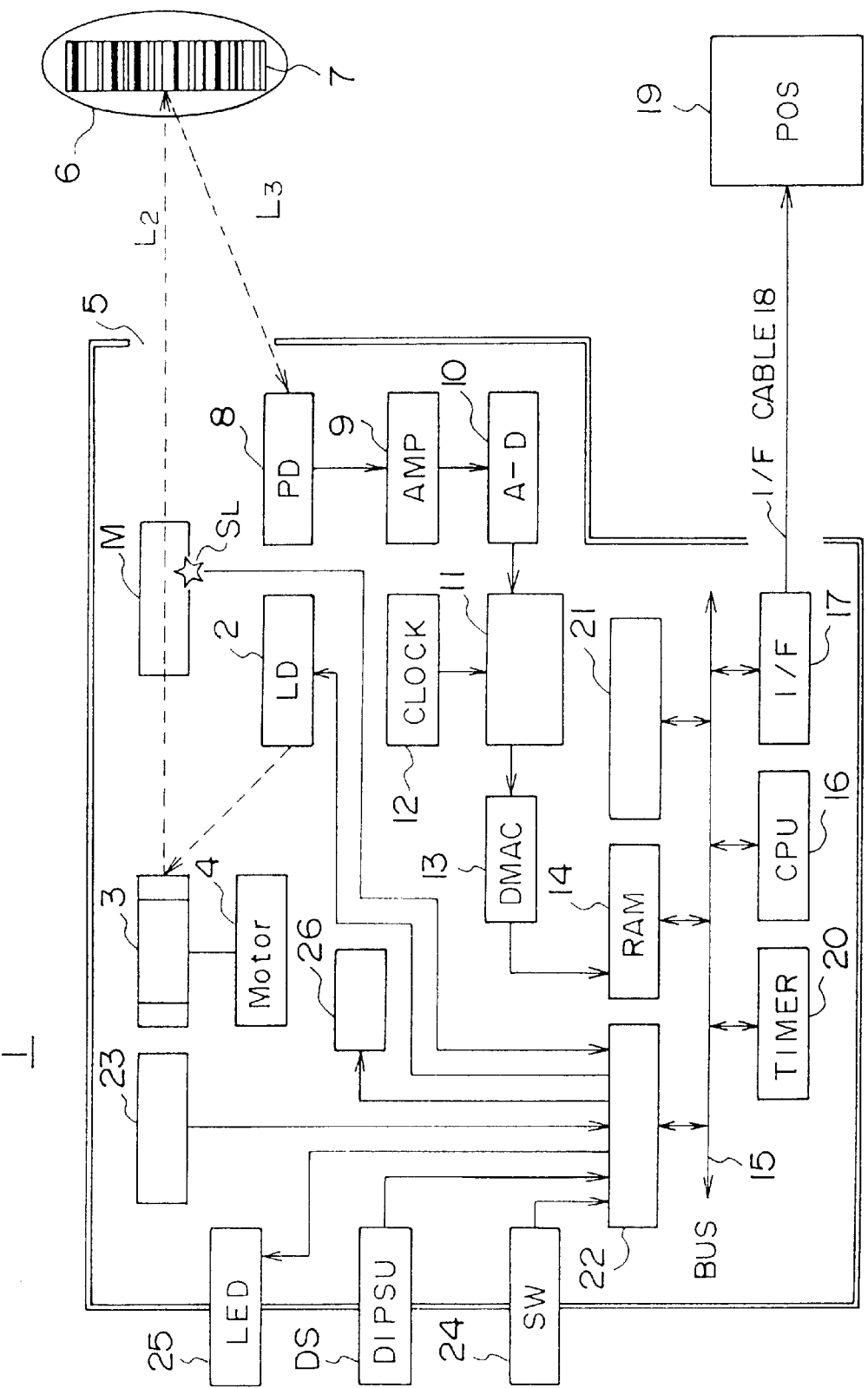
FIG. I

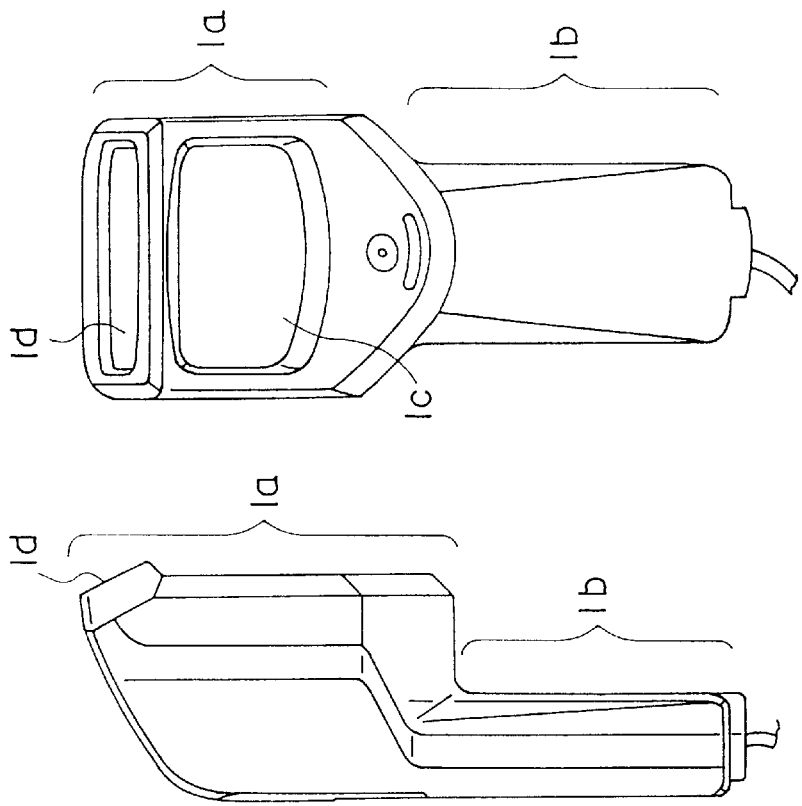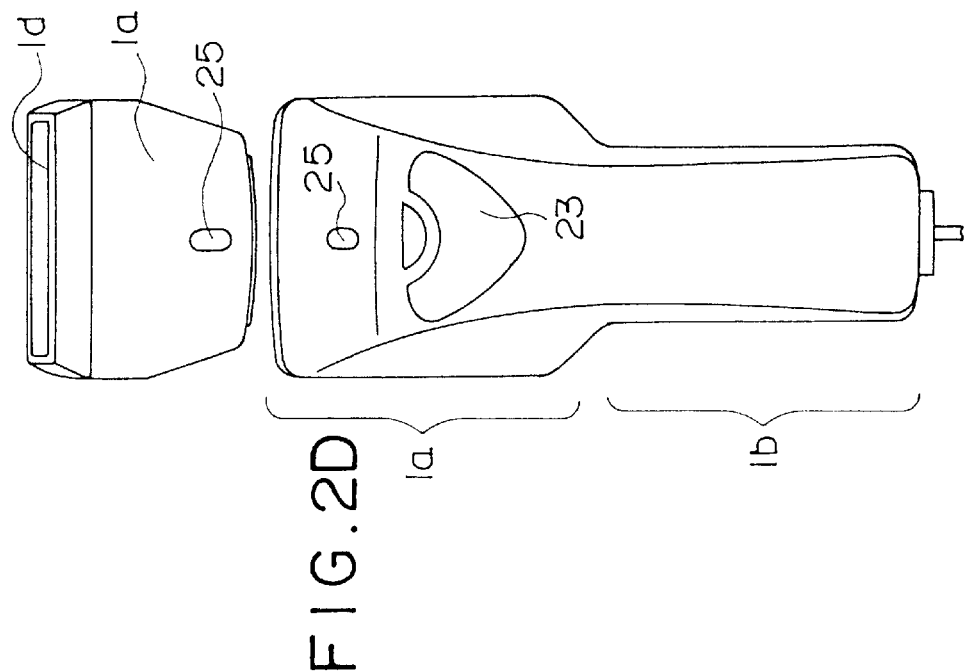

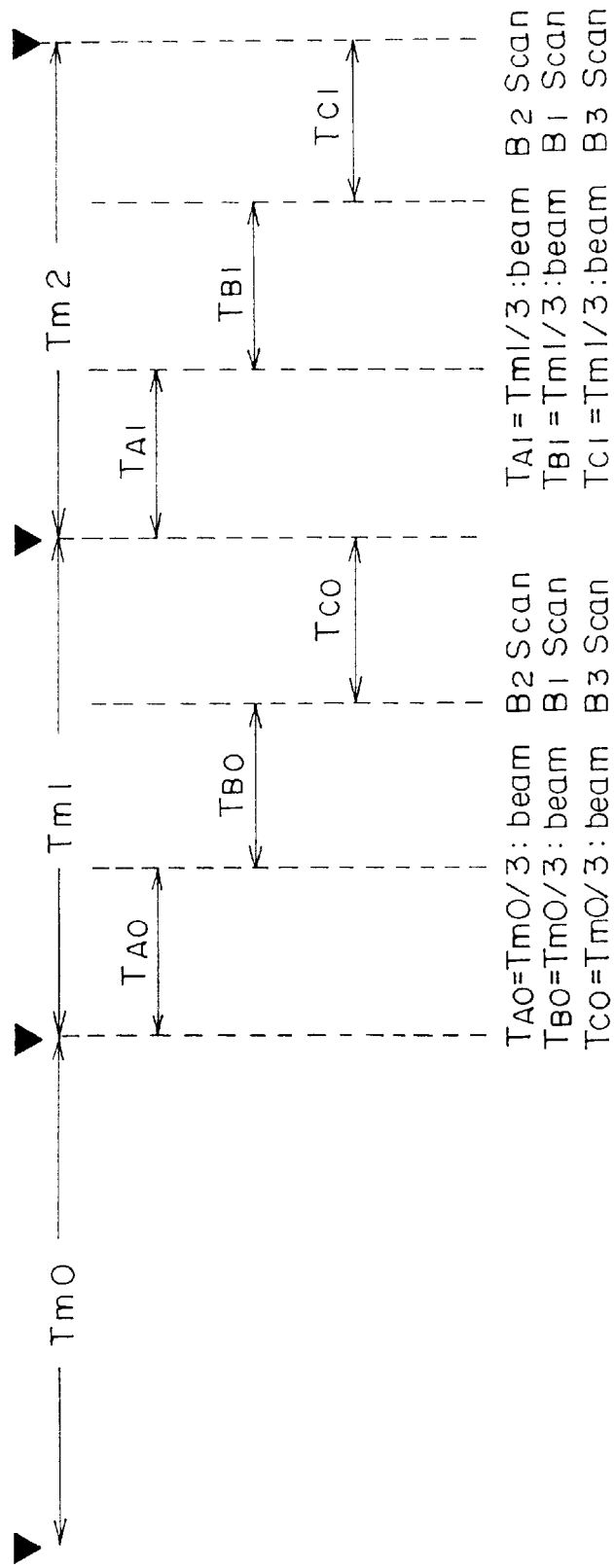

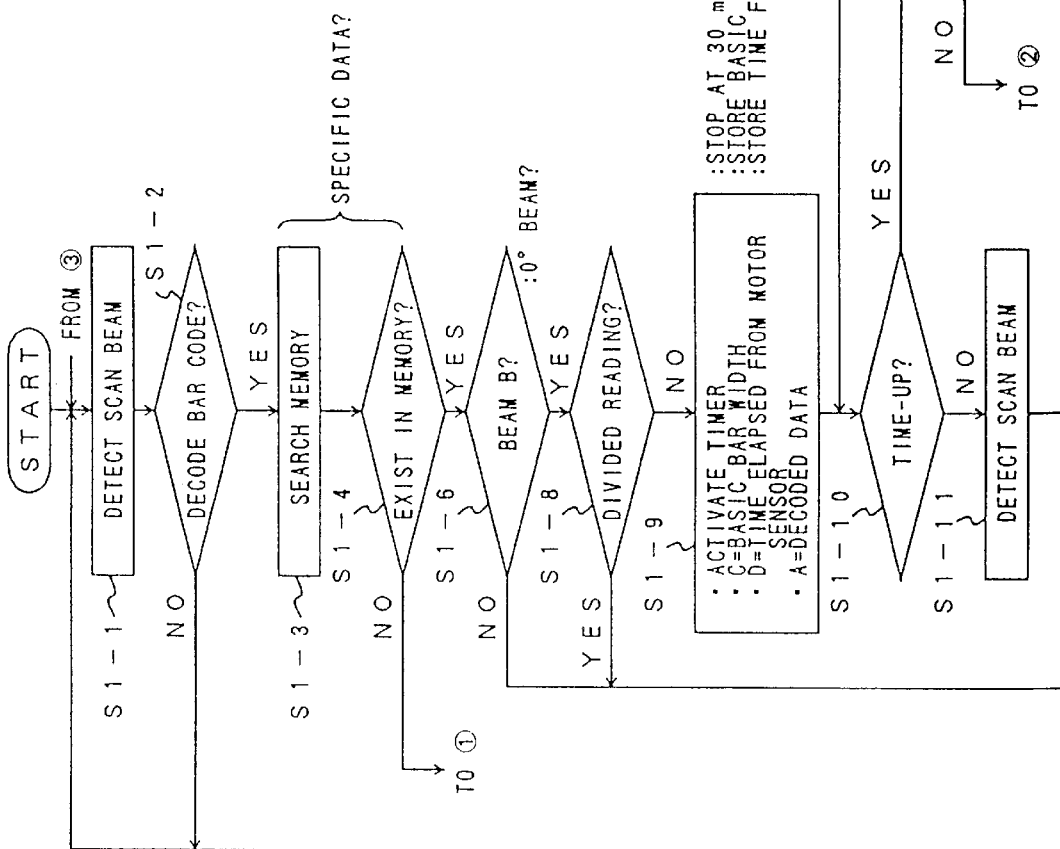

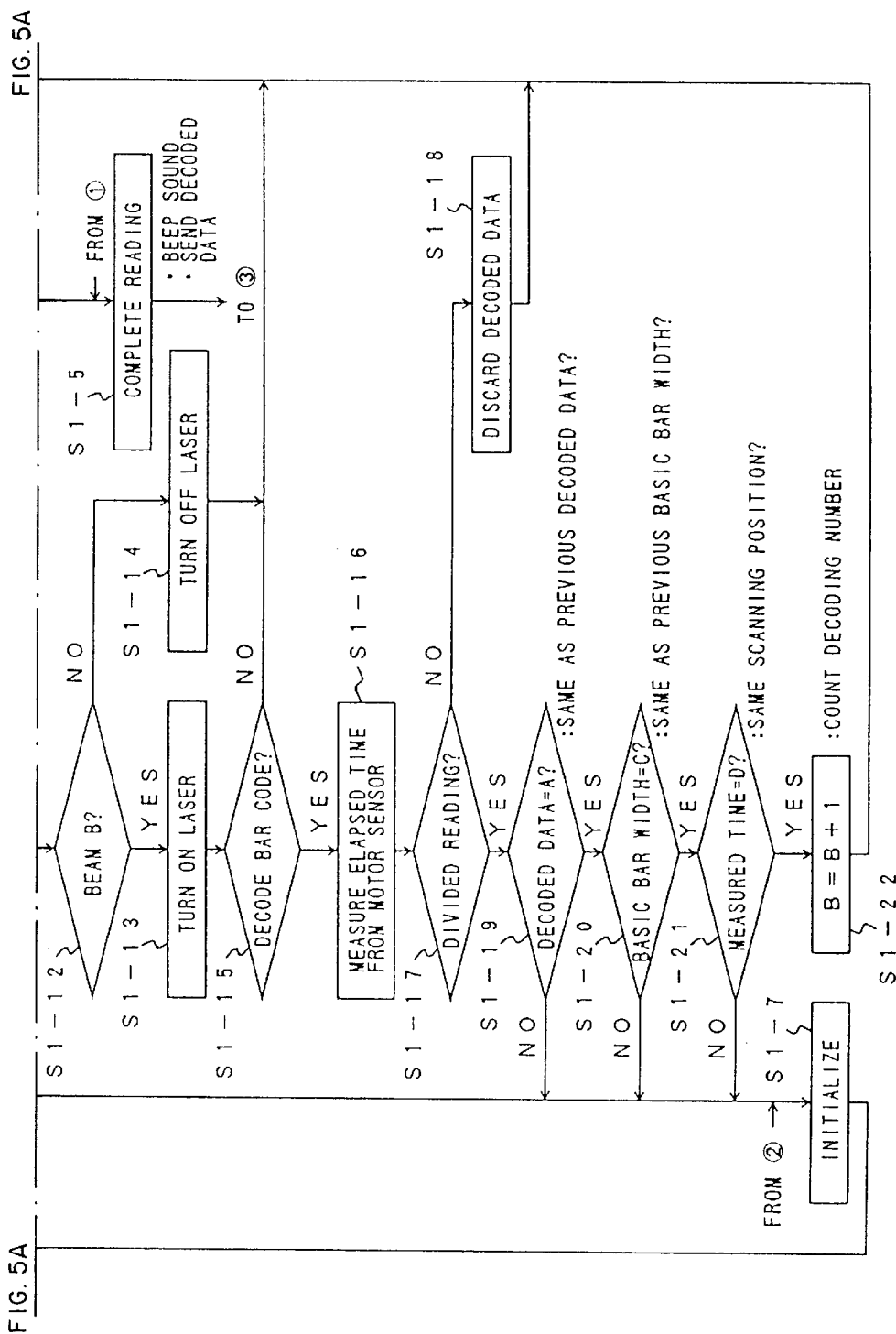

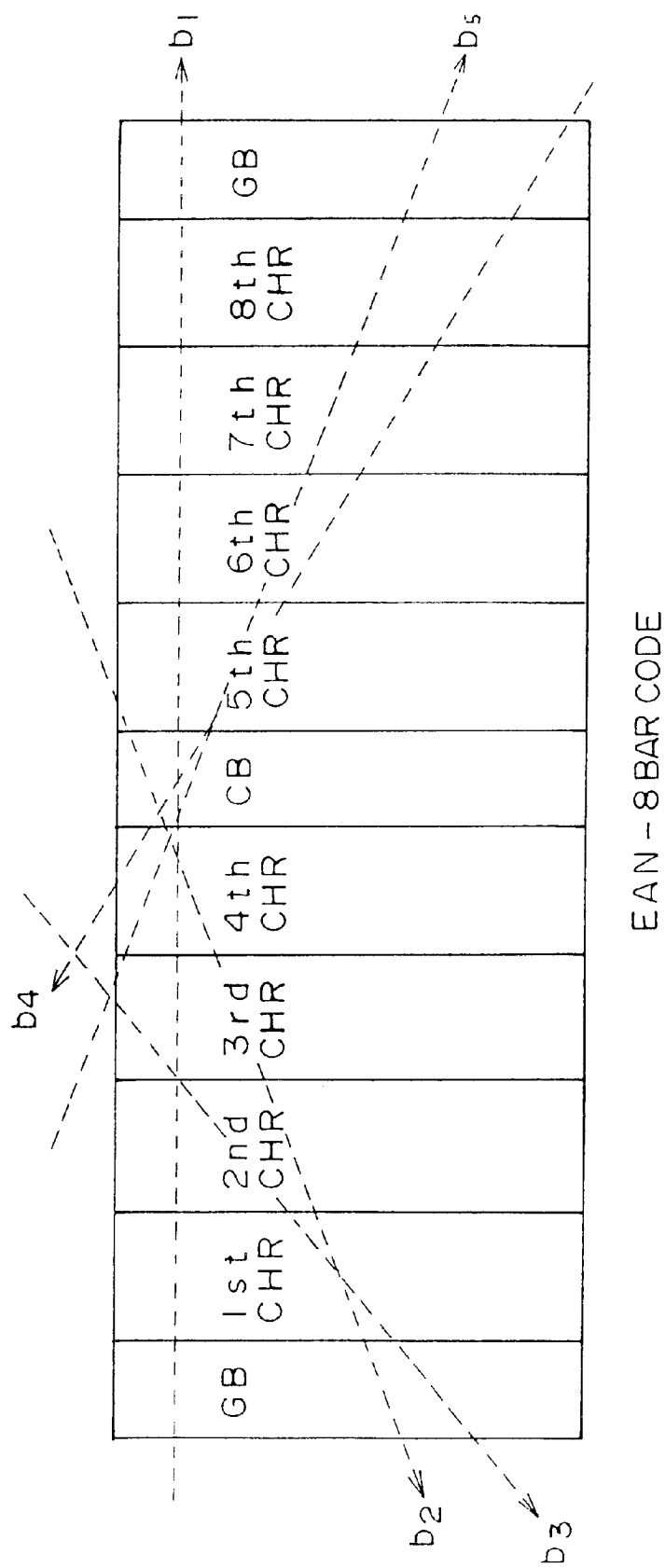

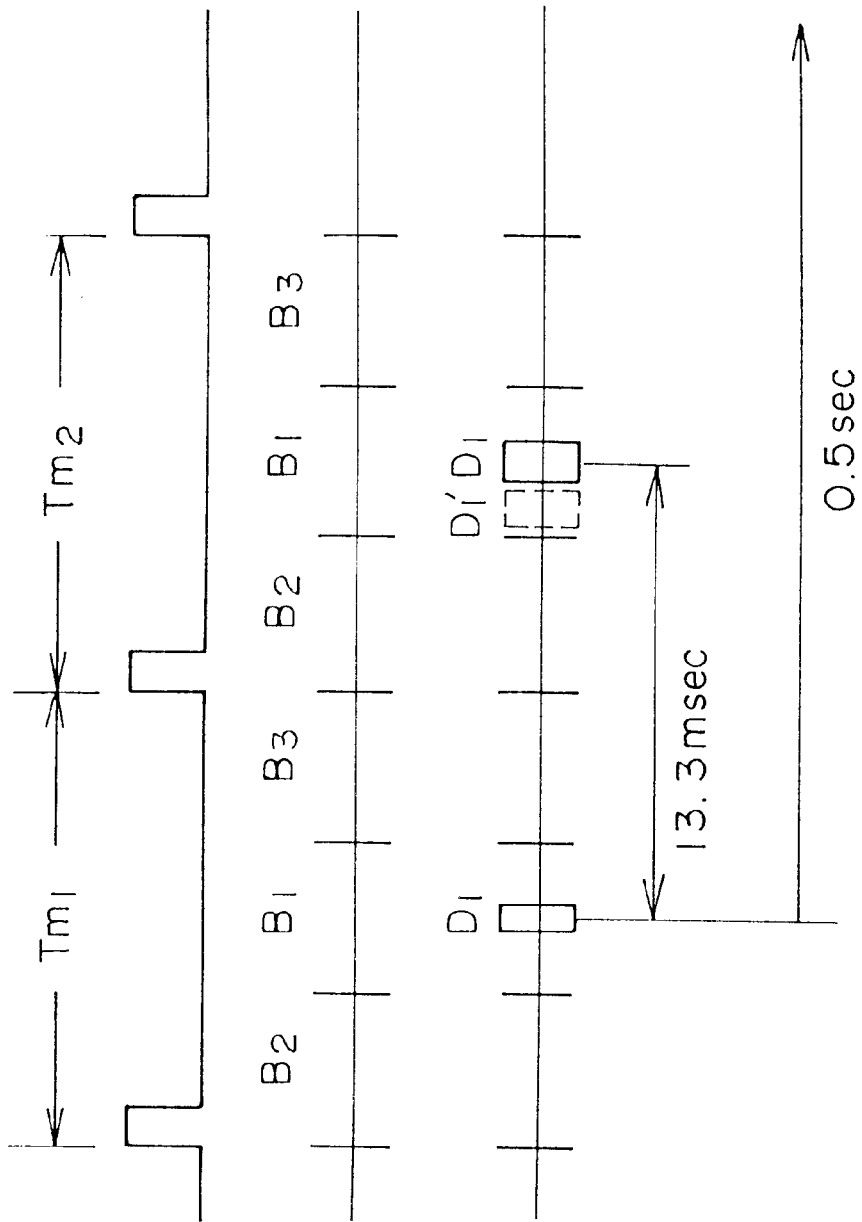

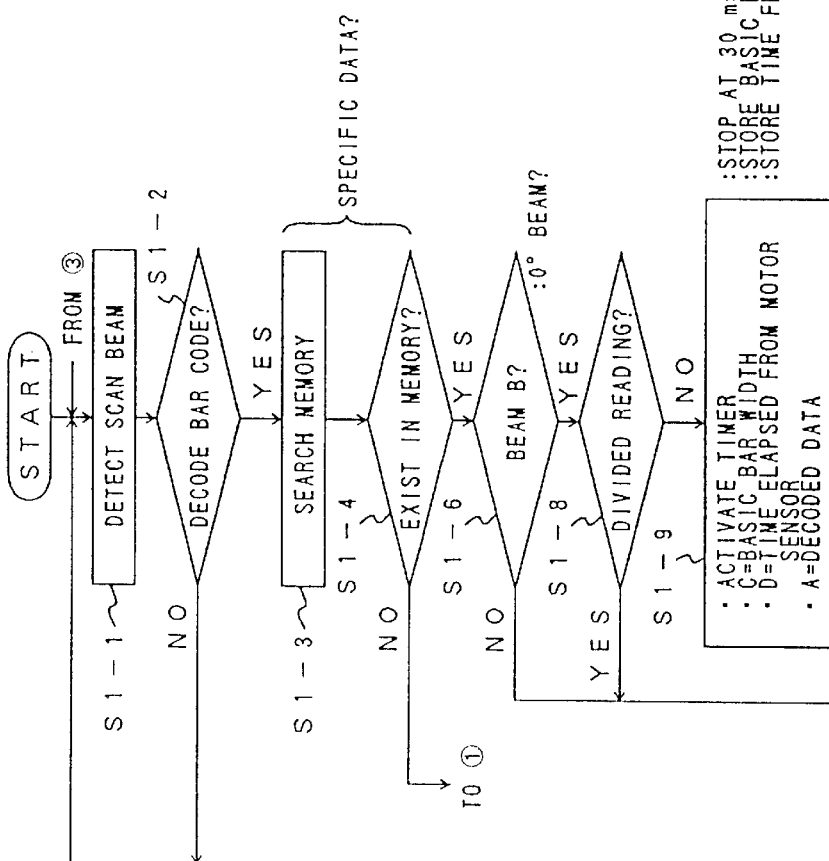

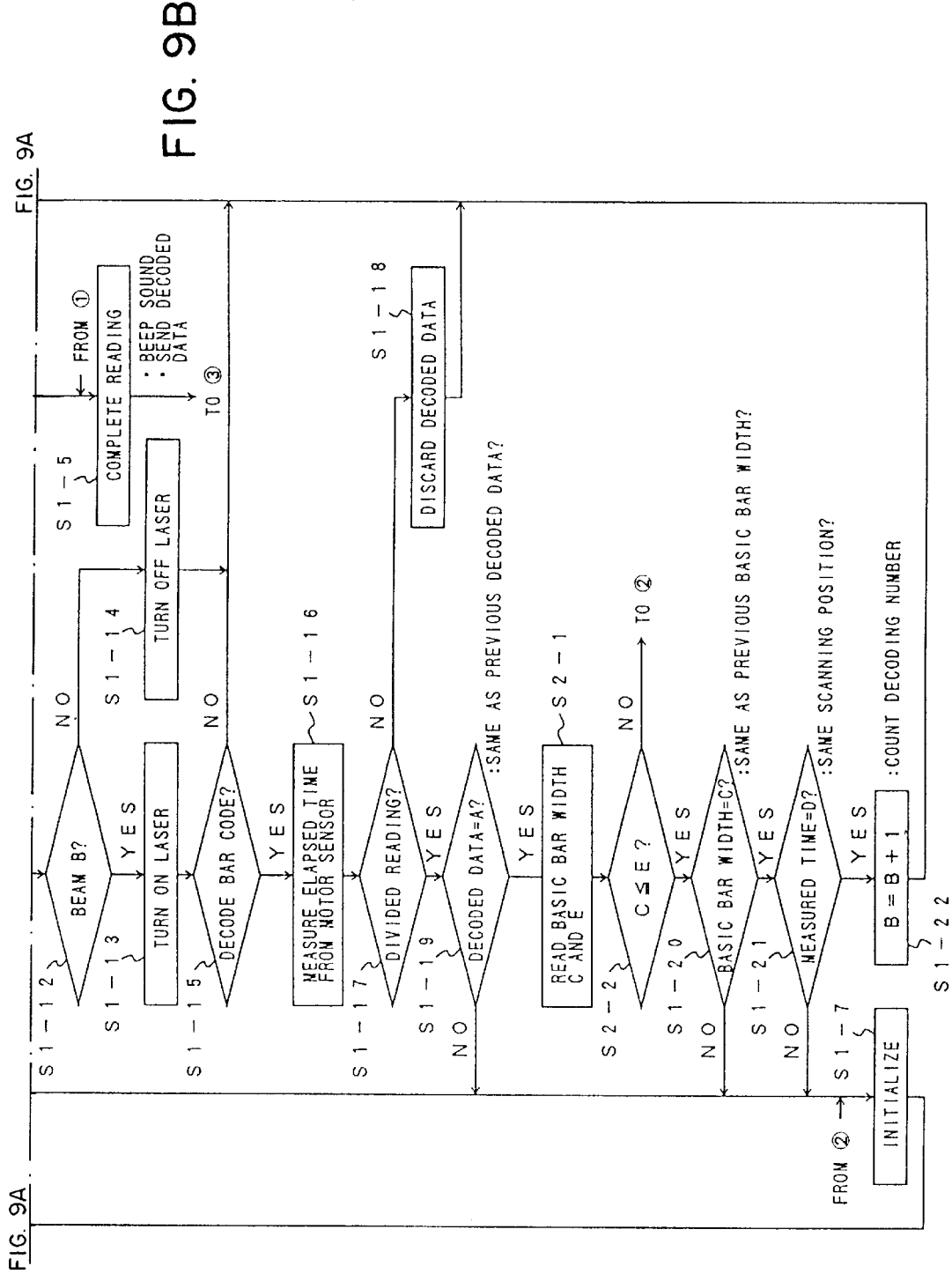

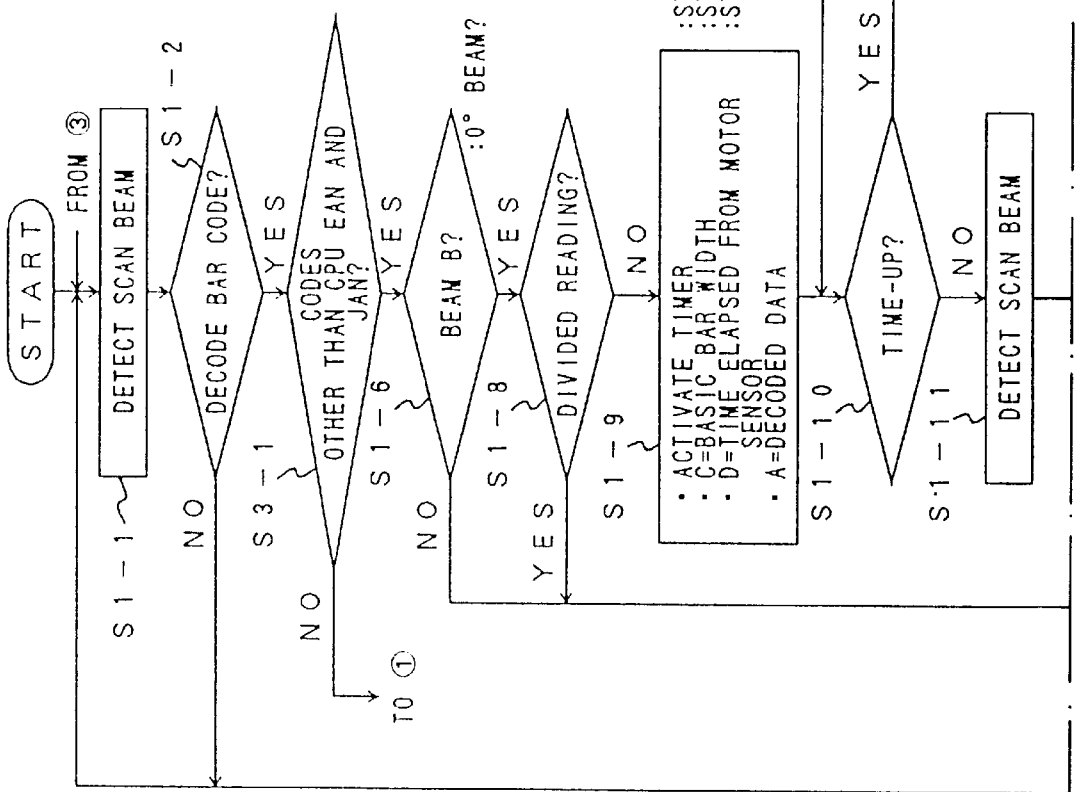

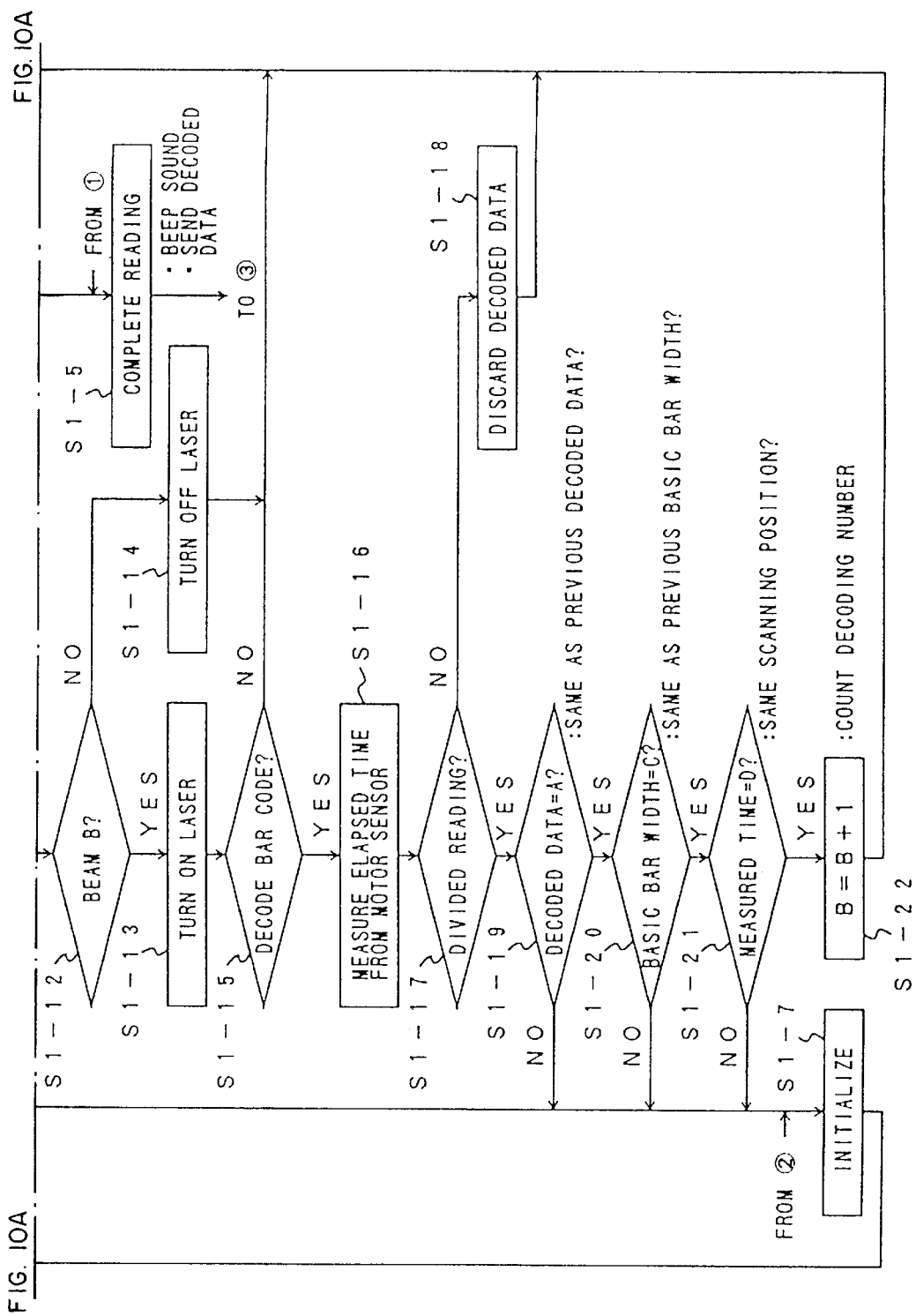

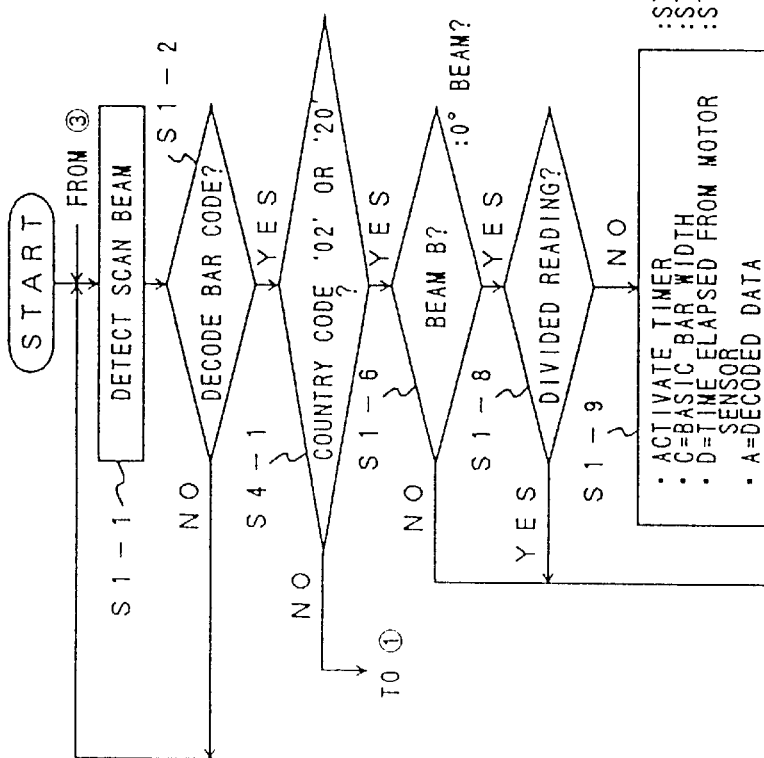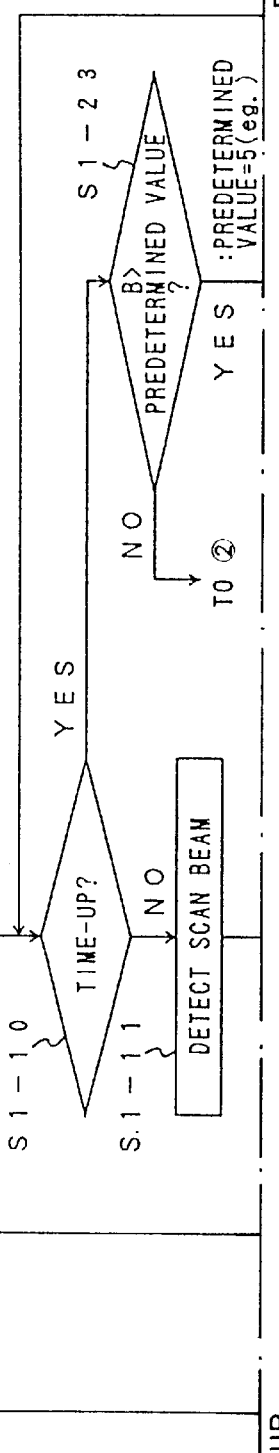

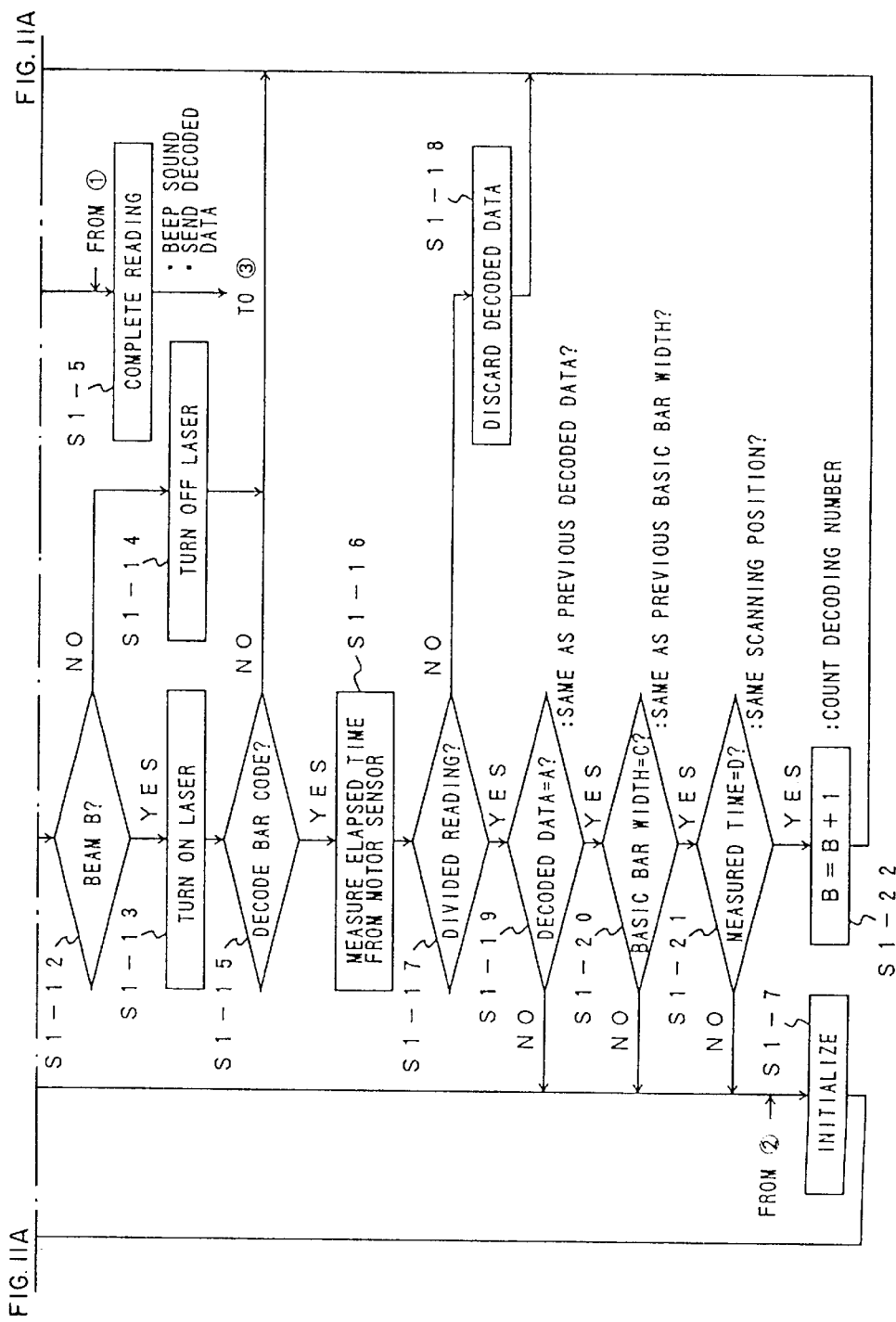

OPTICAL CODE READER AND PROCESS FOR READING OPTICAL CODES

BACKGROUND OF THE INVENTION

1. Field of the Invention

The present invention generally r lates to an optical code reader and a process for reading optical codes, and particularly, to a portable optical code reader using a laser beam and a process for reading optical codes using the optical code reader.

2. Description of the Related Art

Recently, a control of commodities using an optical mark such as a bar code has been widespread among retail stores of many kinds. Accordingly, a demand for a system such as a point-of-sale (POS) system which is necessary for such control of commodities has increased.

In the POS system, an apparatus for reading optical marks such as a bar code reader for reading bar codes have been widely used, and as kinds of commodities dealt with has increased, demands for a bar code reader which may handle such a variety of commodities have also increased.

A so-called "bar code menu" is a list of bar codes, each of which corresponds to a commodity or good onto which a bar code cannot be attached for reasons such as appearance problem or heaviness, and is usually printed onto a sheet of plastic-type paper. For such a bar code menu, a pen-type bar code reader or a touch-scanner which is portable are currently used and are brought directly above a bar code to read. However, one of the problems associated with such portable apparatus is that the length of a scanning beam generated from the apparatus is relatively short.

On the other hand, a bar code reader using a laser beam, which is commonly used by a cashier in a supermarket, etc., is characterized by its long length of the scanning beam and therefore the bar code reader is capable of reading a bar code attached to a commodity even if the commodity is some distance away from a reading site of the apparatus.

A development which has been achieved recently is that the above-mentioned two functions are combined in a bar code reader. That is, the bar code reader is fixed by using, for example, a holder when reading a bar code attached to ordinary goods, and it is released from the holder and used as a portable bar code reader when reading a "bar code menu" or a bar code attached to goods which cannot be moved.

However, since the scanning beam generated from such a bar code reader can reach a relatively long distance, the bar code reader often reads bar codes which are located in the vicinity of an objective bar code in a "bar code menu" as well. Also, since the bar code reader keeps generating a scanning beam even when used as a portable bar code reader, it reads every bar codes, including the ones that are not required to be read, over which it passes during a transfer from one to the other.

If the length of the scanning beam is shortened in order to avoid the above-mentioned problems, the possibility of such accidents cannot be eliminated completely but also the bar code reader may not be used as a fixed apparatus.

SUMMARY OF THE INVENTION

It is a general object of this invention to provide a portable optical code reader and a process for reading optical codes using the optical code reader in which the above mentioned problems are eliminated.

A more specific object of the present invention is to provide a portable optical code reader having a long scanning beam length yet is useful for a portable use.

Another object of the present invention is to provide a process for reading optical codes which may be applied to the above-mentioned optical code reader and also to a POS system.

The objects described above are achieved by a process for reading optical codes comprising: reading an optical code by irradiating a scanning beam onto the optical code and detecting a reflected beam of the scanning beam from the optical code, wherein it is determined if the optical code and an optical code reader are moving relative to each other, and data of the optical code are invalidated when it is determined the optical code and the optical code reader are moving relative to each other, and data of the optical code are validated when it is determined the optical code and the optical code reader are not moving relative to each other.

According to the above process for reading optical codes, since an optical code read during a transfer of the optical code reader is invalidated and an optical code read during a stationary state of the optical code reader is validated, it is possible to read only a necessary optical code just by stopping the optical code reader above the optical code without shortening the length of a scanning beam.

The objects described above are also achieved by the process for reading optical codes wherein it is determined that the optical code and the optical code reader are not moving relative to each other when a plurality of data of the optical code read by the optical code reader are substantially the same.

According to the above process for reading optical codes, since it is determined that the positional relationship between the optical code and the optical code reader is constant when the plurality of data of the optical code are substantially the same, it is possible to positively read only the required optical code.

The objects described above are also achieved by the process for reading optical codes wherein it is determined that the optical code and the optical code reader are not moving relative to each other when reading intervals of the plurality of data of the optical code read by the optical code reader are in a relationship of a multiple of an integer.

According to the above process for reading optical codes, since it is determined that the positional relationship between the optical code and the optical code reader is constant when the relationship of the reading intervals of the plurality of data of the optical code is a multiple of an integer, it is possible to positively read only a required optical code.

The objects described above are also achieved by the process for reading optical codes wherein it is determined that the optical code and the optical code reader are not moving relative to each other when a basic pattern of said optical code is substantially the same basic patterns found among the plurality of data of the optical code read by the optical code reader.

According to the above process for reading optical codes, since it is determined that the positional relationship between the optical code and the optical code reader is constant when a common basic pattern is found among the plurality of data of the optical code, it is possible to positively read only a required optical code.

The objects described above are also achieved by the process for reading optical codes wherein it is determined that the optical code and the optical code reader are not moving relative to each other when a positional relationship between a scanning position of each of the plurality of data of the optical code read by the optical code reader and a reading position for the optical code is substantially unchanged.

According to the above process for reading optical codes, since it is determined that the positional relationship between the optical code and the optical code reader is constant when the relationship between the scanning position of the optical code and the reading position of the optical code reader is substantially unchanged, it is possible to positively read only a required optical code.

The objects described above are also achieved by the process for reading optical codes wherein use or non-use of a recognition function, by which an optical code read during a transfer of the optical code reader is invalidated and an optical code read during a stationary state of the optical code reader is validated, may be selected.

According to the above process for reading optical codes, the use of the recognition function can be properly selected depending on a situation.

The objects described above are also achieved by the process for reading optical codes wherein the use of the recognition function is selected when the release of the optical code reader from a holder is detected.

According to the above process for reading optical codes, since the use of the recognition function is automatically selected when a release of the optical code reader is detected, it is possible to increase operability of the optical code reader.

The objects described above are also achieved by the process for reading optical codes wherein the use of the recognition function is selected when an optical code read by the optical code reader is a specific optical code.

According to the above process for reading optical codes, since the use of the recognition function is automatically selected when the specific optical code is read, it is possible to increase the operability of the optical code reader.

The objects described above are also achieved by the process for reading optical codes wherein a pattern of an optical code read by the optical code reader is compared with a pattern of a specific optical code previously stored, and the use of the recognition function is selected when the pattern of optical code read by the optical code reader is matched with the pattern of the specific optical code.

According to the above process for reading optical codes, since the use of the recognition function is automatically selected when the specific optical code is read, it is possible to activate the recognition function by the certain pattern of an optical code and to increase the operability of the optical code reader.

The objects described above are also achieved by the process for reading bar codes wherein a bar code read by the bar code reader is compared with a specific bar code previously stored, and a divided reading function, in which information of one bar code is generated by combining a plurality of parts of information of the bar code, is invalidated when the bar code read by the bar code reader is matched with the specific bar code previously stored.

According to the above process for reading bar codes, since the divided reading function is invalidated when the bar code read is matched with the specific bar code, and only a bar code read by one scanning is validated, it is not necessary to provide a process in which the data of an objective bar code is generated from a bit of information, and a process of reading bar codes with high speed and accuracy can be obtained.

The objects described above are also achieved by the process for reading optical codes wherein the optical codes are bar codes and the optical code reader is a bar code reader.

According to the above process for reading optical codes, since a bar code read during a transfer of the bar code reader is invalidated and a bar code read during a stationary state of the bar code reader is validated, it is possible to read only a necessary bar code just by stopping the bar code reader above the bar code without shortening the length of a scanning beam.

The objects described above are also achieved by the process for reading optical codes wherein a minimum bar width of a bar code read by the bar code reader is compared with a minimum bar width of a predetermined basic bar widths, and the bar code read by the bar code reader is validated when the minimum bar width of the bar code is wider than the minimum bar width of the predetermined basic bar widths.

According to the above process for reading bar codes, since a bar code is validated only when the minimum bar width of the bar code is wider than the minimum bar width of the predetermined basic bar widths, in other words, only when the distance between the bar code and the bar code reader is in the predetermined range, it is possible to read only a required bar code.

The objects described above are also achieved by an optical code reader for reading optical codes comprising: a light source which generates a scanning beam for scanning an optical code, detection means for detecting a reflected beam from the optical code, wherein the optical code reader is provided with judging means for judging if the optical code and the optical code reader are moving relative to each other, and controlling means for invalidating data of the optical code if it is determined by the judging means that the optical code and the optical code reader are moving relative to each other, and for validating data of the optical code if it is determined by the judging means that the optical code and the optical code reader are not moving relative to each other.

According to the above optical code reader for reading optical codes, since an optical code read during a transfer of the optical code reader is invalidated and an optical code read during a stationary state of the optical code reader is validated, it is possible to read only a necessary optical code just by stopping the optical code reader above the optical code without shortening the length of a scanning beam.

The objects described above are also achieved by the optical code reader for reading optical codes wherein the judging means determine that the optical code and the optical code reader are not moving relative to each other based on a plurality of data of the optical code which are substantially the same.

According to the above optical code reader for reading optical codes, since it is determined that the positional relationship between the optical code and the optical code reader is constant when the plurality of data of the optical code are substantially the same, it is possible to surely read only a necessary optical code.

The objects described above are also achieved by the optical code reader for reading optical codes wherein the judging means determine that the optical code and the optical code reader are not moving relative to each other based on reading intervals of the plurality of data of the optical code read by the optical code reader which are in a relationship of a multiple of an integer.

According to the above optical code reader for reading optical codes, since it is determined that the positional relationship between the optical code and the optical code reader is constant when the relationship of the reading intervals of the plurality of data of the optical code is multiple of an integer, it is possible to surely read only a necessary optical code.

The objects described above are also achieved by the optical code reader for reading optical codes wherein the judging means determine that the optical code and the optical code reader are not moving relative to each other based on a basic pattern which is substantially the same as each other found among the plurality of data of the optical code read by the optical code reader.

According to the above optical code reader for reading optical codes, since it is determined that the positional relationship between the optical code and the optical code reader is constant when a common basic pattern is found among the plurality of data of the optical code, it is possible to surely read only a necessary optical code.

The objects described above are also achieved by the optical code reader for reading optical codes wherein the judging means determine that the optical code and the optical code reader are not moving relative to each other based on a substantially unchanged positional relationship between a scanning position of each of the plurality of data of the optical code read by the optical code reader and a reading position for the optical code.

According to the above optical code reader for reading optical codes, since it is determined that the positional relationship between the optical code and the optical code reader is constant when the relationship between the scanning position of the optical code and the reading position of the optical code reader, it is possible to surely read only a necessary optical code.

The objects described above are also achieved by the optical code reader for reading optical codes wherein the judging means has a recognition function in which an optical code read during a transfer of the optical code reader is invalidated and an optical code read during a stationary state of the optical code reader is validated, and a selecting function for selecting use or non-use of the recognition function.

According to the above optical code reader for reading optical codes, the use of the recognition function can be properly selected depending on a situation.

The objects described above are also achieved by the optical code reader for reading optical codes further comprising: a holder for holding the optical code reader, and detection means for detecting a release of the optical code reader from the holder, wherein the judging means uses the selecting function to operate the recognition function based on a release of the optical code reader from the holder detected by the detection means.

According to the above optical code reader for reading optical codes, since the use of the recognition function is automatically selected when a release of the optical code reader is detected, it is possible to increase operability of the optical code reader.

The objects described above are also achieved by the optical code reader for reading optical codes wherein the judging means uses the selecting function in order to operate recognition function when an optical code read by the optical code reader is a specific optical code.

According to the above optical code reader for reading optical codes, since the use of the recognition function is automatically selected when the specific optical code is read, it is possible to increase the operability of the optical code reader.

The objects described above are also achieved by the optical code reader for reading optical codes further comprising memory means for storing the specific optical code, wherein the judging means use the selecting function in order to operate the recognition function when a pattern of an optical code read by the optical code reader is matched with a pattern of a specific optical code stored in the memory means.

According to the above optical code reader for reading optical codes, since the use of the recognition function is automatically selected when the specific optical code is read, it is possible to activate the recognition function by the certain pattern of an optical code and to increase the operability of the optical code reader.

The objects described above are also achieved by the optical code reader for reading optical codes wherein the judging means has a divided reading function, in which information of one optical code is generated by combining a plurality of parts of information of the optical code, that is invalidated when the optical code read by the optical code reader is matched with an optical code stored in the memory means.

According to the above optical code reader for reading optical codes, since the divided reading function is invalidated when the optical code read is matched with the specific optical code, and only an optical code read by one scanning is validated, there is not necessary to provide a process in which the data of an objective optical code is generated from a bit of information, and a process of reading optical code with high speed and accuracy can be obtained.

The objects described above are also achieved by the optical code reader for reading optical codes wherein the optical code reader is a bar code reader and the optical codes are bar codes.

According to the above optical code reader, since a bar code read during a transfer of the optical code reader is invalidated and a bar code read during a stationary state of the optical code reader is validated, it is possible to read only a necessary optical code just by stopping the optical code reader above the optical code without shortening the length of a scanning beam.

The objects described above are also achieved by a bar code reader for reading bar codes wherein the judging means compares a minimum bar width of a bar code read by the bar code reader with a minimum bar width of predetermined basic bar widths and validate the bar code read by the bar code reader when the minimum bar width of the bar code is wider than the minimum bar width of the predetermined basic bar widths.

According to the above bar code reader for reading bar codes, since a bar code is validated only when the minimum bar width of the bar code is wider than the minimum bar width of the predetermined basic bar widths, in other words, only when the distance between the bar code and the bar code reader is in the predetermined range, it is possible to read only a necessary bar code.

Other objects and further features of the present invention will be apparent from the following detailed description when read in conjunction with the accompanied drawings.

BRIEF DESCRIPTION OF THE DRAWINGS

FIG. 1 is a block diagram according to an embodiment of the present invention;

FIG. 2A is a diagram showing a plan view of a bar code reader according to an embodiment of the present invention;

FIG. 2B is a side view of the bar code reader according to an embodiment of the present invention;

FIG. 2C is a front view of the bar code reader to an embodiment of the present invention;

FIG. 2D shows a back view of the bar code reader according to an embodiment of the present invention;

FIG. 4 is a timing chart of an optical system according to an embodiment of the present invention;

FIG. 5 is a flow chart showing the operation of a CPU according to an embodiment of the present invention;

FIG. 6 is a diagram for explaining a divided reading function;

FIGS. 7A to 7C are diagrams for explaining a judgment operation according to an embodiment of the present invention;

FIG. 9 is a diagram showing a flow chart of main operations according to a first alternative embodiment of the present invention;

FIG. 10 is a diagram showing a flow chart according to a second alternative embodiment of the present invention; and FIG. 11 is a diagram showing a flow chart according to a third alternative embodiment of the present invention;

DESCRIPTION OF THE PREFERRED EMBODIMENTS

Figure 3B:
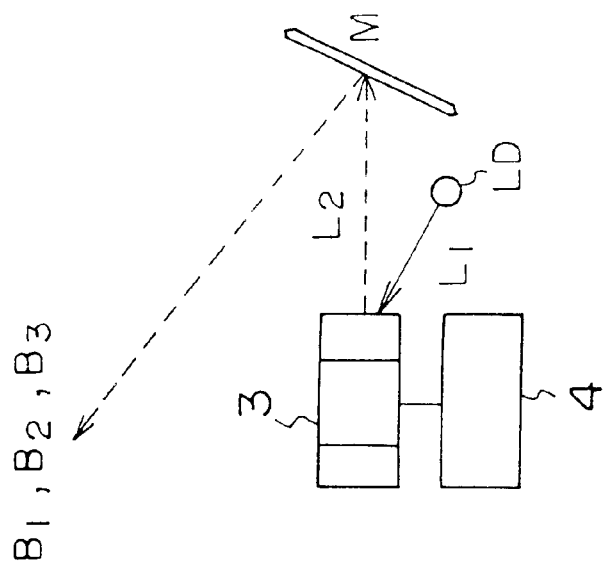
FIG. 3B shows a side view of the construction of the optical system according to an embodiment of the present invention.

In the following, a principle and embodiments of the present invention will be described with reference to the accompanying drawings.

FIG. 1 is a block diagram according to an embodiment of the present invention. As shown in FIG. 1, the bar code reader 1, which is a first embodiment of an optical code reader according to the present invention, uses a laser scanning beam and a bar code is read by irradiating the beam onto the bar code and detecting a reflected light from the code. As mentioned above, the bar code reader 1 is fixed by using, for instance, a holder when reading a bar code attached to ordinary goods, and it is released from the holder and used as a portable bar code reader when reading a "bar code menu" or a bar code attached to a commodity or goods which cannot be moved, etc.

FIG. 2A is a diagram showing a plan view of the bar code reader 1 according to an embodiment of the present invention. FIG. 2B is a side view of the same bar code reader 1, FIG. 2C shows a front view and FIG. 2D shows a back view of the bar code reader 1 according to an embodiment of the present invention. As shown in the figures, the bar code reader 1 comprises a head portion 1a and a holding portion 1b. When used in a fixed state, the holding portion 1b of the bar code reader 1 may be supported by a holder.

Inside the head portion 1a, a light source, a polygonal mirror, a mirror for splitting scanning beam and a detector are provided. A laser scanning beam generated in the head portion 1a is output through a reading window 1c or 1d. That is, when the bar code reader 1 is used in a fixed state, a bar code attached to a commodity or goods passes over the reading window 1c. When the bar code reader 1 is used for "bar code menu" etc., on the other hand, it is brought close to an objective bar code and the bar code is read through the reading window 1d.

Referring to FIG. 1 again, the laser beam $L_1$ generated in a laser diode LD2 is irradiated onto a polygonal mirror 3. The polygon 3 possesses a plurality of reflective surfaces and is rotated by a motor 4. The laser beam $L_1$ irradiated from the diode LD2 is scanned by the polygon 3 and irradiated onto the mirror M. The mirror M is comprised of a plurality of mirror pieces and so the laser scanning beam $L_2$ is reflected by the mirror M to be transmitted through a reading window 5.

Figure 3A:
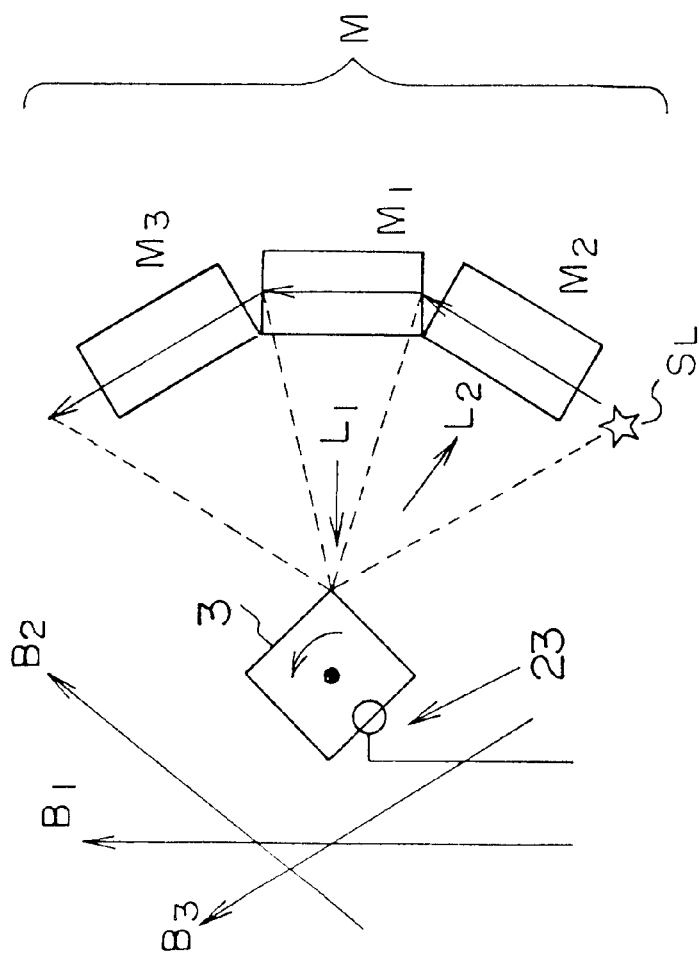
FIG. 3A shows a plan view of a construction of an optical system according to an embodiment of the present invention.

FIGS. 3A and 3B show the construction of an optical system according to an embodiment of the present invention. FIG. 3A shows a plan view and FIG. 3B shows a side view of the embodiment.

As shown in FIGS. 3A and 3B, the laser beam $L_1$ is scanned by the polygon 3 and irradiated onto the mirror M. The mirror M is divided into three portions in this embodiment, namely mirror $M_1$, $M_2$, and $M_3$. The laser beam $L_2$ scanned by the polygon 3 is reflected by those three mirrors $M_1$, $M_2$ and $M_3$ and divided into three beams, $B_1$, $B_2$ and $B_3$, in three directions as shown in FIG. 3A.

A photosensor $S_L$ is provided at a portion where the reflected laser scanning beam $L_2$ from the mirror M is first irradiated so that the starting point of scanning can be detected.

Also, a sensor 23 for detecting rotation of a motor 4 shown in FIG. 3B is provided in the vicinity of the motor 4. The sensor 23 generates a predetermined number of pulses during rotation of the motor 4 or the polygon 3. For this reason, it is possible to detect a scanning position of the laser scanning beam $L_2$ by counting a number of pulses generated by the sensor 23 and also which one of the three beams, $B_1$, $B_2$ and $B_3$ responsible for the scan, can be detected.

FIG. 4 is a timing chart of an optical system according to an embodiment of the present invention.

As above mentioned, the laser beam reflected by a reflective surface of the polygon 3 and scanned is reflected again by the mirror $M_1$, $M_2$ or $M_3$ and divided into three beams, $B_1$, $B_2$ and $B_3$. In FIG. 4, Tm0 expresses the period in which the laser beam $L_2$ is irradiated onto the mirror $M_1$, $M_2$ and $M_3$, sequentially. The term $T_{AO}$ is the period in which the beam $B_2$ is generated by the mirror $M_2$ which reflects the laser beam $L_2$. Likewise, $T_{BO}$ is the period in which the beam $B_1$ is generated by the mirror $M_1$ and $T_{CO}$ is the period in which the beam $B_3$ is generated by the mirror $M_3$.

At this time, the duration of $T_{AO}$, $T_{BO}$ and $T_{CO}$, respectively is adjusted so that each duration becomes approximately one third of the period Tm0. For this reason, it is possible to detect that which one of the three beams, $B_1$, $B_2$ and $B_3$, is read by detecting the rotation amount of the polygon 3 using the photosensor $S_L$ and the sensor 23. In addition, the beam $B_1$ is called the 0° beam which is a beam scanned in a direction the same as an extending direction of a bar code. Thus, the $B_1$ beam is a most suitable beam for reading an entire bar code at one time.

Referring to FIG. 1 again, the laser beam $L_2$ ($B_1$, $B_2$ and $B_3$) is irradiated onto a bar code 7 attached to goods 6 as shown in the figure. The bar code 7 has a configuration which is determined by UPC (Universal Product Code), EAN (European Article Code), JAN (Japan Article Number) and so on.

The laser beam $L_2$ irradiated on the bar code 7 is reflected by the bar code 7 and the reflected beam $L_3$ passes through the reading window 5 and is transmitted into a photodiode PD8. The photodiode PD8 generate photocurrent according to the reflected beam $L_3$. The photocurrent then is supplied to an amplifier 9 in order to become an amplified signal.

The signal amplified in the amplifier 9 is sent to an analog/digital (A/D) converter 10. The A/D converter 10 compares a level of the signal with a certain basic level and converts the signal to a high-level pulse if the level of the signal is larger than the basic level. If the level of signal is smaller than the basic level, the A/D converter 10 converts the signal to a low-level pulse: The pulse thus converted is then supplied to a bar width counter 11 to which a clock from a clock generating circuit 12 is also supplied.

The bar width counter 11 counts the width of each of the pulses according to a clock supplied from the clock generating circuit 12 and measures a count value according to a low-level pulse width and a count value according to a high-level pulse width. The count values measured in the bar width counter 11 are stored in a random access memory (RAM) 14 via a direct memory access controller (DMAC) 13.

The RAM 14 is connected to a CPU 16 via BUS 15 and the count values, which correspond to a pattern of the bar code 7 and stored in RAM 14, are supplied to the CPU 16. The CPU recognizes the bar code and sends it to a POS system 19 via an interface circuit 17 and an interface cable 18.

Besides the CPU 16 and the interface circuit 17, a timer 20, non-volatile memory 21 and input and output ports 22 are connected to the BUS 15 and the CPU 16 controls a recognition of the bar code 7 by the signal supplied to the timer 20, non-volatile memory 21 and input and output ports 22.

The sensor 23 for detecting a rotational position of the polygon 3, a switch for recognizing a manual operation, light-emitting diode (LED) 25 for indicating a state of operation and a buzzer 26 for notifying a recognition of a code are connected to the input and output ports 22 and controlled by the CPU 16.

There are two reading modes, namely a normal reading mode and a stationary state detecting reading mode, which are controlled by the CPU 16.

The normal reading mode, which is used when the bar code reader 1 is fixed by using, for instance, a holder, is a mode in which decoded data stored in the RAM 14 is directly recognized as a reading data and is sent to the POS system via the interface circuit 17 and an interface cable 18.

The stationary state detecting reading mode, which is used when the bar code reader 1 is released from the holder and used as a portable bar code reader, is a mode in which decoded data stored in the RAM 14 is recognized as a reading data only when a relative position to a bar code becomes stationary state. In other words, when the bar code reader is moving relative to a bar code, data obtained during that movement are recognized as void.

In the non-volatile memory 21, data which carries out the stationary state reading mode are stored. The data are stored in the non-volatile memory 21 by setting the CPU 16 in a data writing mode and reading bar codes, which should be recognized in the stationary state reading mode, using the normal reading mode. At this time, a transfer to the data writing mode is carried out, for example, by switching a dip switch DS provided with the bar code reader. Also, it is possible to make a mode changing bar code and transfer to the data writing mode by reading this bar code and read bar codes of specific pattern data. Moreover, it is possible to input the data beforehand through the POS system via the interface cable 18 and the interface circuit 17. Further, since the non-volatile memory is used for this purpose, it is possible to protect the data of specific bar codes if, for example, a current supply is stopped.

The above-mentioned dip switch DS is responsible for changing the reading mode for reading bar codes to a specific data reading mode in which the data of bar codes recognizable in the stationary state are stored in the non-volatile memory 21 or vice versa.

Next, the operation of the CPU 16 will be explained with reference to FIG. 5. FIG. 5 is a flow chart showing the operation of the CPU 16 when a bar code which switches the reading modes is read according to an embodiment of the present invention. In step S1-1, the CPU 16 detects a scanning position of the laser scanning beam $L_2$ according to a rotational pulse signal from the sensor 23. In step S1-2, the bar code 7 is decoded and a determination is made if it is stored in the RAM 14. If the bar code 7 is decoded and the decoded data are stored in the RAM 14, the specific pattern data stored in the non-volatile memory 21 beforehand are searched in step S1-3. As mentioned above, the specific pattern data stored in the non-volatile memory 21 were read by the non-volatile memory 21 previous to proceeding to the stationary state reading mode.

The reading of specific data becomes possible by setting the mode of the bar code reader 1 in the specific data reading mode. In the specific data reading mode, data read by the bar code reader 1 are stored in the non-volatile memory 21 as specific data and when they are read a basic bar width E is detected and stored as a set basic bar width E. The step S1-3 is a process for judging if specific pattern data are stored in the non-volatile memory 21.

As a result of research made in the step S1-3, if it is found that data which are the same as one of the decoded data stored in the RAM 14 exist in the non-volatile memory 21, the mode of the bar code reader is changed to the stationary state detecting reading mode since it is determined that the decoded data stored in the RAM 14 should be read in the stationary state detecting reading mode. If there is no data which are the same as the decoded data stored in the RAM 14 in the non-volatile memory 21, it is determined that the decoded data stored in the RAM 14 should be read in the normal reading mode and the decoded data are directly supplied to the POS system via the interface circuit 17 and the interface cable 18 in the normal reading mode (steps S1-4 and S1-5).

The LED 25 is turned off when the steps S1-1 to S1-5 are carried out, and it is turned on after the steps S1-6. That is, during the normal reading mode of the steps S1-1 to S1-5, the LED is turned off, and it is turned on during the stationary state detecting reading mode after the step S1-6. Therefore, it is possible to recognize the current mode of the bar code reader by the indication of the LED 25.

If data the same as the decoded data exist in the non-volatile memory 21 in the step S1-4, then, it is determined if a scanning direction of the laser scanning beam $L_2$ is a direction of the 0° beam which is a direction that makes the reading of a bar code possible by only one scanning. As mentioned above, the scanning position is determined by a rotational position of the motor 4 or the polygon 3 using the photosensor $S_L$ and the sensor 23.

In the step S1-6, if the decoded data are read when the scanning direction of the laser scanning beam $L_2$ is other than that of the 0° beam, the decoded data stored in the RAM 14 are discarded and the RAM 14 is initialized (step S1-7).

In the step S1-6, if the decoded data are read when the scanning direction of the laser scanning beam $L_2$ is that of the 0° beam, then it is determined if the decoded data needs divided reading (step S1-8).

FIG. 6 is a diagram for explaining the divided reading function. In the divided reading, one bar code is read by a plurality of beams in different directions, i.e., in this case $b_2$, $b_3$, $b_4$ and $b_5$, and information obtained from each beam is put together and data of one entire bar code are obtained. For instance, in FIG. 6, the beam $b_2$ decodes GB, CHR 1-4 and CB of the bar code. Also, the beam $b_3$ decodes GB and CHR 1-2 of the bar code. Similarly, the beam $b_4$ decodes CB, CHR 5-8 and GB and the beam $b_5$ decodes CHR 4, CB, CHR 5-8 and GB of the bar code. Therefore, by putting together the decoded data of the beam $b_2$ and those of the beam $b_4$ or the beam $b_5$, an entire decoded data may be reproduced. In addition, if the bar code is read by the beam $b_1$ in FIG. 6, it is not a divided reading since the entire bar code is read by just one scanning.

Referring back to FIG. 5, if the decoded data are in a state in need of a divided reading, that is an entire bar code is not scanned or GB—GB is not detected, in the step S1-8, the decoded data stored in the RAM 14 are discarded and the RAM 14 is initialized (step S1-7) since only data of a bar code which are read by one scanning are valid in the stationary reading mode.

If the decoded data are in a state which does not require the divided reading in the step S1-8, i.e, an entire bar code is read by just one scanning or GB13 GB is detected, the timer 20 is activated and the basic bar width of decoded data is stored in a register C of the CPU 16. The elapsed time from a base point of the polygon to a decoding start point (or bar code detection point) is stored in the register D and the decoded data read are stored in the register A of the CPU 16 (step S1-9).

The basic bar width of decoded data in the case of the UPC bar code, for example, is determined from the first character of the left-hand side (next to the guard bar) to the character of the right-hand side. However, the basic bar width is not limited.

In step S1-10, it is detected if a certain amount of time sufficient for obtaining decoded data, for example 300 msec, has passed since the activation of the timer 20.

If it is determined that the elapsed time is within 300 msec in the step S1-10, then, it is judged whether the beam carrying out the reading is the 0° beam (steps S1-11 and S1-12). If the beam is determined to be the 0° beam in the step S1-12, a laser beam is output from the laser diode LD2 (step S1-13). Also, if the beam is determined to be other than the 0° beam in the step S1-12, the output of a laser beam is stopped by turning off the laser diode LD2 (step S1-14). It is possible, of course, to set the time other than 300 msec.

Moreover, the laser diode LD2 is turned on when the beam is in the timing of the 0° beam and is turned off if the beam is other than that in the above case. It is also possible, in addition to the turning on/off of the laser diode LD2, to carry out a data decoding process by the CPU 16 in the timing of the 0° beam and stop the process if the beam is other than the 0° beam. That is, the use of a laser control may be combined with a decoding control and a reading is validated when the beam is the 0° beam and it is invalidated when the beam is other than the 0° beam.

According to the steps S1-11, S1-12, S1-13 and S1-14, since the laser diode LD2 is only turned on in the timing of the stationary state detecting reading mode, the consumption of energy can be reduced and a reading of unnecessary bar code may be avoided.

When the laser beam is emitted in the step S1-12, it is determined if the bar code is decoded by the laser scanning beam $L_2$ (step S1-15). If decoded data are obtained in the step S1-15, then the time duration between the detection of the laser scanning beam $L_2$ by the photosensor SL and the detection of the polygon 3 or the motor 4 rotation by the sensor 23 is measured in order to obtain the time necessary for obtaining the decoded data (step S1-16).

Then it is determined if the obtained decoded data requires a divided reading (step S1-17).

If it is determined that the divided reading is necessary in the step S1-17, the decoded data are discarded and the process waits for the next reading timing (step S1-18).

If it is determined that the divided reading is unnecessary in the step S1-17, i.e., if it is determined that the decoded data are read in one scanning, then it is judged that the decoded data stored in the RAM 14 is the same as that stored in the register A (step S1-19). If the decoded data stored in the RAM 14 is different from the decoded data stored in the register A, it is judged that the bar code reader 1 is in motion and the RAM 14 is initialized to go back to step S1-1 (step S1-7).

If the decoded data stored in the RAM 14 are the same as those store in the register A in the step S1-19, it is determined that the bar code reader 1 is in a stationary state and the laser scanning beam $L_2$ is irradiated on the bar code to be read. Then, it is determined, based on the decoded data, if the basic bar width of the read bar code matches with the basic bar width of the bar code initially read and stored in the register C (step S1-20).

If it is determined that the basic bar width of the bar code is different from that of the bar code stored in the register C, i.e., the size of the detected bar code is different and the distance between the bar code reader and the bar code is too close or too far, then it is judged that a reading distance is changed from the initial reading distance and the bar code reader 1 is in a transfer state, and the RAM 14 is initialized to go back to step S1-1 (step S1-7).

If it is determined that the basic bar width of the bar code is the same as that of the bar code stored in the register C, then it is judged that the bar code reader 1 is in a stationary state relative to the bar code and the laser scanning beam $L_2$ is irradiate on the objective bar code.

If it is determined that the bar code reader 1 is in a stationary state and the laser scanning beam $L_2$ is irradiate on the objective bar code in the step S1-20, then it is judged that the time measured in the step S1-16 corresponds with the time initially taken when stored in the register D in step S1-9 (step S1-21).

FIGS. 7A to 7C are diagrams for explaining a judgment operation according to an embodiment of the present invention. In FIG. 7A, shows a pattern of sensor $S_L$ output, FIG. 7B shows a timing chart of beams $B_1$, $B_2$ and $B_3$, FIG. 7C shows a timing chart of decoded data $D_1$.

As explained in FIG. 4, a scanning repeated in the beam order $B_1$, $B_2$, $B_3$ during periods $T_{m0}$, $T_{m1}$ and $T_{m2}$. Supposing the decoded data $D_1$ is obtained by the beam $B_1$ and the bar code reader is in a stationary state relative to the bar code, the decoded data $D_1$ will be obtained in a time of $T_{B1}$ where the beam $B_1$ is output within the period of $T_{m1}$. Thus, the decoded data $D_1$ are read by a predetermined cycle. Therefore, by measuring the time between the first reading and the second reading of the decoded data $D_1$ using the photosensor $S_L$ and the sensor 23 and if the time measured matches with the expected time from the rotation speed of the motor 4 (13.3 msec in the case shown in FIG. 7C, it is determined that the relative position of the bar code reader to the bar code is in a stationary state. Also, it is possible to compare the time from a start of sensor $S_L$ output shown in FIG. 7A to a detection of $D_1$ shown in FIG 7C.

If the measured time is different in the step S1-21, it is judged that the data are decoded by a different beam and the bar code reader is not in a stationary state. Also, even if the data are decoded by a same beam, it is recognized as an error if a timing of detection is different as shown in FIG. 7(C) as $D_1{}^1$. Thus, the RAM 14 is initialized and goes back to the step S1-1 (step S1-7).

If the measured time is matched in the step S1 21, it is determined that the laser scanning beam $L_2$ scans the same position of the bar code and that the bar code reader 1 is in a stationary state relative to the object bar code. If it is determined that the bar code reader 1 is in the stationary phase relative to the bar code in the step S1-21, then 1 is added to the decoding number B and returns to the step S1-10 (step S1-22).

When a predetermined time by which it is determined that the bar code reader 1 goes into a stationary state, for instance, 300 msec, has elapsed in the step S1-10, it is judged if the decoding number B counted in the step S1-22 is bigger than a predetermined number, for example, 5, which indicates a possible decoding number by the bar code reader 1 during a stationary state of within 300 msec (step S1-23).

If the decoding number B is bigger than 5 in the step S1-23, it is judged that the bar code reader 1 is in a stationary state relative to a bar code in order to read the bar code, and the decoded data stored in the register A or RAM 14 are recognized as reading data and are sent to the POS system 19 via the interface circuit 17 and the interface cable 18 after proper manipulation is performed (step S1-5).

If the decoding number B is equal to or less than 5 in the step S1-23, it is determined that the bar code reader 1 is in transfer state and the RAM 14 is initialized to go back to the step S1-1 (step S1-7).

It is possible, of course, to make a determination of the stationary state and the transfer state with respect the decoding number B equal to or larger than 5, or less than 5, respectively, in the above-mentioned step S1-23.

As described above, according to the present invention, decoded data of a desired bar code are stored in the non-volatile memory 21 in advance, and if decoded data of a read bar code are the same as one of the data previously stored in the non-volatile memory 21, the stationary state detecting reading mode is applied so that the objective bar code may be read in the stationary state detecting reading mode without carrying out any special operation.

Also, according to the present invention, the scanning direction of the laser scanning beam $L_2$ is controlled so that only the 0° beam is output during the stationary state detecting reading mode in order to be articulated with the characteristics of a portable bar code reader. In this configuration, low-energy energy consumption, a long-life of the laser diode and a prevention of reading unnecessary bar codes is achieved.

Moreover, according to the present invention, in a stationary state of the bar code reader relative to a bar code, the stationary state of the bar code is detected by repeatedly comparing decoded data with previously decoded data and only when they are consecutively matched for a certain number. Thus, decoded data of an objective bar code can be positively read in the stationary state.

Further, not only the matching of the decoded data but also the matching of the basic bar width are used for detecting a reading height which is a distance between the bar code reader and the bar code, and only when the reading height is smaller than that previously read, it is recognized that the bar code reader 1 is coming closer to the bar code. Thus, it is possible to read only a required bar code with high accuracy. In this case, a tolerance may be set for the matching of the decoded data and the matching of the basic bar width.

Further, according to the present invention, the scanning position of the laser scanning beam $L_2$ can be detected by the sensor 23 and the elapsed time from a base point to the actual reading of a bar code is measured. Thus, it is possible to detect a displacement of the bar code relative to the bar code reader 1 and to determine a user's intention to read the particular bar code. In this case, also, a tolerance may be set for the scanning position of the laser scanning beam $L_2$.

As mentioned above, according to the present invention, it is possible to read only a required bar code without decreasing the length of the scanning beam by combining a plurality of elements such as decoded data, basic bar width, scanning time and decoding number.

Note that although the stationary state detecting reading mode is carried out when specific decoded data are obtained according to the above embodiment, the manner of application of the stationary state is not limited and, for example, it is possible to have a construction in which the stationary state detecting reading mode is selected when the switch 23 is actuated.

Also, the switch 23 is not limited to a push-type switch and, for instance, a photo interrupter can be used so that the stationary state detecting reading mode is selected when the bar code reader is hand-held.

Figure 8:
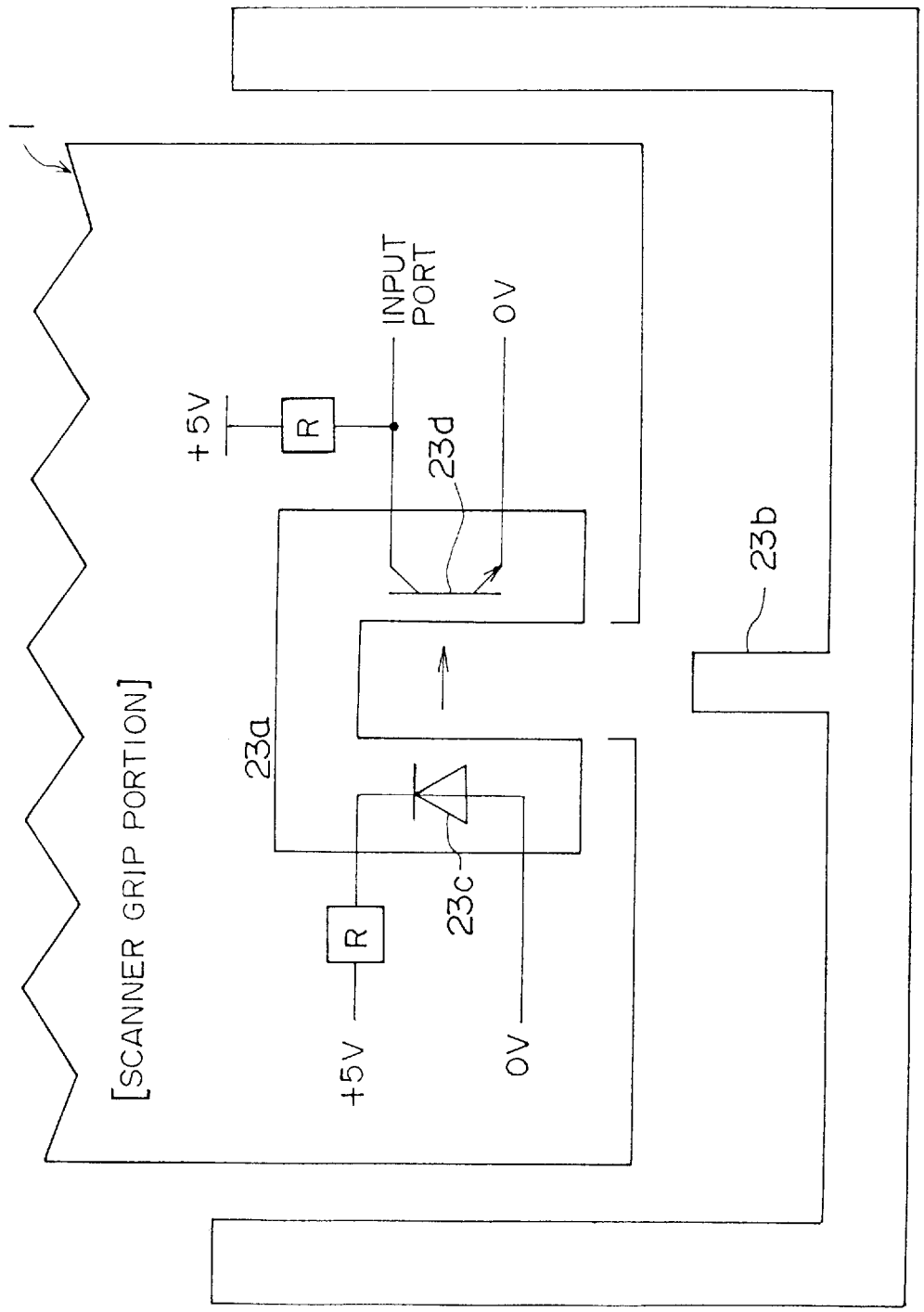
FIG. 8 shows a structure of an alternative switch according to an embodiment of the present invention.

FIG. 8 shows a structure of an alternative switch according to an embodiment of the present invention. As shown in FIG. 8, the switch 23 is comprised of a photo interrupter 23a and a holder 23. That is, when the bar code reader 1 is supported by a holder 23b and used as an fixed-type bar code reader, a projection 23e formed with the holder 23b is inserted between a photodiode 23c of the photo interrupter 23a and the phototransistor 23d so that no light is supplied to the phototransistor 23d from the photodiode 23c. Thus, the phototransistor 23d is turned off and assumes a high-level. When the bar code reader is used as a portable bar coder reader, on the other hand, there is no obstacles between the photodiode 23c of the photo interrupter 23a and the phototransistor 23d and so the phototransistor 23d is turned on and the output assumes a low-level.

When the output from the photo interrupter 23a is supplied to the input and output ports 22 and a high-level signal is supplied to the CPU 16 from the photo interrupter 23a, the CPU may carry out the normal reading mode, and a low-level signal is supplied to the CPU 16 from the photo interrupter 23a, the CPU may carry out the stationary state reading mode.

Also, it is possible to activate the timer 20 so that the stationary state detecting reading mode is operated only for a time necessary for completing a reading of a bar code, for instance, 2 seconds, after a selection of the stationary state detecting reading mode.

Although the processes shown in FIG. 5 are all carried out in the bar code reader 1 in the above embodiment, it is possible to carry out all of them or at least a part of the processes in the POS terminal 9. If such a structure is adopted, it is possible to reduce the number of processes carried out in the bar code reader and its structure can be simplified.

Also, the non-volatile memory 21 is provided in the bar code reader and specific pattern data are stored beforehand in the non-volatile memory 21 in order to select the normal reading mode or the stationary state detecting reading mode in the above embodiment, however, it is possible to store the specific pattern data in the POS terminal 9 and send the specific pattern data from the POS terminal 9 to the non-volatile memory 21 where they are stored before the actual use of the bar code reader 1. At this time, if a structure of the POS system is adopted, in which the specific pattern data are automatically sent every time the power is switched on, the memory required for storing such data is not necessarily non-volatile.

Also, it is possible, especially for a store or restaurant chain, to supply the specific pattern data not from the POS terminal 9 in each individual store or restaurant but from the computer system controlling all of the POS terminal. In such a case, there is no need to carry out the initial reading operation of the specific pattern data in each store or restaurant and cost and time can be saved.

Moreover, according to the above embodiment of the present invention, the recognition of the bar code that should be read is performed by comparing the basic bar width of a decoded bar code with the basic bar width of a stored bar code. It is also possible, however, to perform the reading of a bar code when the basic bar width of the bar code is wider than a predetermined value since the scanning speed of the bar code reader 1 has a characteristic of getting slower in proportion to a distance between the reading window 5 of the bar code reader 1 and the object bar code due to the fact that the laser beam $L_1$ from the light source of the bar code reader 1 is reflected by the polygon 3 and the mirror 3 and the scanning is made in a radial direction.

FIG. 9 is a diagram showing a flow chart of main operations according to a first alternative embodiment of the present invention. In FIG. 9, the same reference numeral is used for the operation that corresponds to the same operation in FIG. 5 and the explanation thereof is omitted.

According to this alternative embodiment, a basic bar width E of a bar code 7 that is read in relation to the distance between the reading window 5 of the bar code reader 1 and the bar code 7 is stored in the non-volatile memory 21.

Comparing the flow chart shown in FIG. 9 and that of the FIG. 5, the difference lies between the step S1-19 and the step S1-20. According to this alternative embodiment, the basic bar width C calculated in the step S1-9 and stored and the basic bar width C stored in the non-volatile memory 21 are read when the decoded data are matched with the previous data in the step S1-19 (step S2-1).

Then, the basic bar width C of the bar code 7 and the basic bar width E previously stored in the non-volatile memory 21 are compared (step S2-2). If the basic bar width C of the bar code 7 is wider than the basic bar width E stored in the non-volatile memory 21, i.e., (C>E), it is determined that the scanning speed of the laser beam $L_2$ is fast and reading width of the bar code is narrow and therefore the position of the reading window 5 of the bar code reader 1 relative to a bar code is farther than a predetermined distance. Thus, the step goes back to the step S1-7, the memory 14 is initialized and the decoded data are discarded.

If the basic bar width C of the bar code 7 is smaller than the basic bar width E stored in the non-volatile memory 21, i.e., (C≦E, it is determined that the scanning speed of the laser beam $L_2$ is in the range of a predetermined scanning speed and the distance between the reading window 5 of the bar code reader 1 relative to a bar code is also in the range of a predetermined distance. Thus, it is determined that a user has intention to read the bar code and the step goes to S1-20.

Although the basic bar width C of the bar code 7 is directly compared with the basic bar width E previously stored in the non-volatile memory 21 in this alternative embodiment, it is possible to use a modified basic bar width $E_0$ which is a value obtained by multiplying the basic bar width E read from the non-volatile memory 21 in the step S2-1 by a constant R (i.e., $E_0$=E×R). For instance, the modified basic bar width $E_0$ can be made smaller than the basic bar width E by setting $E_0$=E×0.7, which makes possible the reading of a bar code located further from the bar code reader compared with the case where $E_0$=E. Thus, if a value obtained by, for example, the equation $E_0$ =E×0.7 is registered as the basic bar width at a registration, it is possible to provide some range in a reading position of bar codes and read a bar code positioned further from the bar code reader.

Also, according to this embodiment, data are recognized as specific data only when they are matched with the data of a bar code previously store in the non-volatile memory 21 in the steps S1-3 and S1-4. However, different ways of such recognition are not limited and it is possible, for example, to operate the normal reading mode when UPC (Universal Product Code), EAN (European Article Code) and JAN (Japan Article Number) are used, and the stationary state detecting reading mode when a specific code such as C128 and C39, which are previously set as a specific code, is used.

FIG. 10 is a diagram showing a flow chart according to a second alternative embodiment of the present invention. In FIG. 10, the same reference numeral is used for the operation that corresponds to the same operation in FIG. 5 and the explanation thereof is omitted.

According to this alternative embodiment, a step S3-1, in which it is determined if a decoded bar code is one of the UPc, EAN and JAN or the other bar codes when the bar code is decoded in the step S1-2, is provided instead of the steps S1-3 and S1-4 shown in FIG. 5.

If the decoded bar code in the step S3-1 is one of the UPC, EAN and JAN bar code, it is determined that a normal reading mode is appropriate and the process goes to the step S1-5 to recognize the decoded bar code as a reading code.

If the decoded bar code in the step S3-1 is other than the one of the UPC, EAN and JAN bar code, such as a binary code of C128 or C39, it is determined that the data are specific data and the process moves to the step S1-6.

According to the above configuration of the alternative embodiment of the present invention, it is possible to reduce the task of the CPU 16 since only the detection of the kind of code is necessary and a search of the entire non-volatile memory 21 is not required.

Also, this embodiment may be applied to the first alternative embodiment. Moreover, it is possible to combine the second alternative embodiment with the embodiment of the present invention.

Further, according to the second alternative embodiment of the present invention, although the recognition of specific data is performed by detecting whether the bar code is one of the UPC, EAN and JAN code, various ways of the recognition of specific data are not limited and, for example, specific data can be determined from the country code attached to each of the UPC, EAN or JAN code.

That is, the first two digits of the UPC, EAN and JAN code expresses a country such as the numeral 49 indicates Japan and the numeral 50 indicates England. On the other hand, numerals 20 and 02 are provided for a user to freely use them, therefore, it is possible to recognize a certain data as special data when the two figures are 20 or 02.

FIG. 11 is a diagram showing a flow chart according to a third alternative embodiment of the present invention. In FIG. 11, the same reference numeral is used for the operation that corresponds to the same operation in FIG. 5 and the explanation thereof is omitted.

According to this alternative embodiment, a step S4-1 is provided instead of the steps S1-3 and S1-4 shown in FIG. 5, in which the first two digits (country code) of a decoded bar code are detected and if the country code is either 20 or 02, it is recognized as specific data when the bar code is decoded in the step S1-2.

If the country code of the decoded bar code in the step S4-1 is other than 20 or 02, it is determined that a normal reading mode is appropriate and the process goes to the step S1-5 to recognize the decoded bar code as a reading code.

If the country code of the decoded bar code in the step S4-1 is 20 or 02, then it is regarded as specific data and the process moves to the step S1-6.

According to the above configuration of this alternative embodiment of the present invention, it is possible to reduce the task of the CPU 16 since only the first two digits are required to be detected and a search of the entire non-volatile memory 21 is not necessary.

Although this embodiment is explained for a portable bar code reader, it is possible, of course, to apply the embodiment to a fixed-type bar code reader. Also, this embodiment may be applied to the first and second embodiments of the present invention. That is, the number of specific data may be increased by setting the UPC, EAN and JAN code whose country code is either 20 or 02 as specific data.

It is obvious that the present invention is not limited to these embodiments, and variations and modifications may be made without departing from the scope of the present invention.

What is claimed is:

1. A process for reading a code, comprising:

reading a code by irradiating a scanning beam from a code reader onto said code and detecting a reflected beam of said scanning beam, reflected from said code, by said code reader;

determining if said code and said code reader are moving relative to each other;

invalidating data of said code when it is determined that said code and said code reader are moving relative to each other; and validating data of said when it is determined that said code and said code reader are not moving relative to each other.

2. The process for reading a code as claimed in claim 1, wherein it is determined that said code and said code reader are not moving, relative to each other, when a plurality of data of said codes read by said code reader, are substantially the same.

3. The process for reading a code as claimed in claim 1, wherein it is determined that said code and said code reader are not moving, relative to each other, when reading intervals of said plurality of data of said code, read by said code reader, are in a relationship of a multiple of an integer.

4. The process for reading a code as claimed in claim 1, wherein it is determined that said code and said code reader are not moving, relative to each other, when a basic pattern of said code is substantially the same basic found among said plurality of data of said code, read by said code reader.

5. The process for reading a code as claimed in claim 1, wherein it is determined that said code and said code reader are not moving, relative to each other, when a positional relationship, between a scanning position of each of a plurality of data of said code, read by said code reader, and a reading position for said code is substantially unchanged.

6. The process for reading a code as claimed in claim 1, wherein one of a use and a non-use of a recognition function, by which a code read during a transfer of said code reader is invalidated and a code read during a stationary state of said code reader is validated, may be selected.

7. The process for reading a code as claimed in claim 6, wherein the use of said recognition function is selected when a release of said code reader from a holder is detected.

8. The process for reading a code as claimed in claim 7, wherein the use of said recognition function is selected when a code read by said code reader is a specific code.

9. The process for reading a code as claimed in claim 6, wherein a pattern of said code read by said code reader is compared with a pattern of a specific code previously stored, and the use of said recognition function is selected when said pattern of said code, read by said code reader, is matched with said pattern of said specific code.

10. The process for reading a code as claimed in claim 1, wherein said code read by said code reader is compared with a specific code previously stored, and, in a divided reading function, information of one code, generated by combining a plurality of parts of information of said code, is invalidated when said code read by said code reader is matched with said specific code previously stored.

11. The process for reading a code as claimed in claim 1, wherein said codes are bar codes and said code reader is a bar code reader.

12. The process for reading a code as claimed in claim 11, wherein:

a minimum bar width of said bar code read by said bar code reader is compared with a minimum bar width of a predetermined basic bar widths; and said bar code read by said bar code reader is validated when the minimum bar width of said bar code is wider than the minimum bar width of said predetermined basic bar widths.

13. A code reader for reading a code comprising:

a light source generating a scanning beam for scanning the code;

a detector detecting a beam reflected from said code;

a judging unit judging if said code and said code reader are moving relative to each other; and a controller invalidating data of said code if it is determined by said judging unit that said code and said code reader are moving relative to each other, and validating data of said code if it is determined by said unit that said code and said code reader are not moving relative to each other.

14. The code reader for reading a code as claimed in claim 13, wherein said judging unit determines that said code and said code reader are not moving, relative to each other, when a plurality of data of said code, read by said code reader, are substantially the same.

15. The code reader for reading a code as claimed in claim 13, wherein said judging unit determines that said code and said code reader are not moving, relative to each other, reading intervals of said plurality of data of said code, read by said code reader, are in a relationship of a multiple of an integer.

16. The code reader for reading a code as claimed in claim 13, wherein said judging unit determines that said code and said code reader are not moving, relative to each other, when a basic pattern of said code is substantially the same basic pattern found among said plurality of data of said code read by said code reader.

17. The code reader for reading a code as claimed in claim 13, wherein said judging unit determines that said code and said code reader are not moving, relative to each other, when there exists a substantially unchanged positional relationship between a scanning position of each of said plurality of data of said code read by said code reader, and a reading position for said code.

18. The code reader for reading a code as claimed in claim 13, wherein said judging unit performs:
   a recognition function by which code read during a transfer of said code reader is invalidated and a code read during a stationary state of said code reader is validated; and
   a selecting function for selecting one of a use and a non-use of said recognition function.

19. The code reader for reading a code as claimed in claim 18, further comprising:
   a holder holding said code reader;
   a detector detecting a release of said code reader from said holder; and
   said judging unit uses said selecting function to operate said recognition function, based on the release of said code reader from said holder, as detected by said detector.

20. The code reader for reading a code as claimed in claim 18, wherein said judging unit uses said selecting function to operate said recognition function when a code read by said code reader is a specific code.

21. The code reader for reading a code as claimed in claim 18, further comprising:
   a memory storing said specific code; and
   said judging unit uses said selecting function to operate said recognition function when a pattern of a code read by said code reader matches a pattern of a specific code stored in said memory.

22. The code reader for reading a code as claimed in claim 13, wherein said judging unit has a divided reading function, in which information of one code, generated by combining a plurality of parts of information of said code, is invalidated when said code, read by said code reader, is matched with a code stored in said memory it.

23. The code reader for reading a code as claimed in claim 13, wherein said code reader is an optical bar code reader and said codes are bar codes.

24. The code reader for reading a code as claimed in claim 23, wherein said judging unit compares a minimum bar width of a bar code, read by said optical bar code reader, with a minimum bar width of predetermined basic bar widths and validates the optical bar code, read by said bar code reader, when the minimum bar width of said read optical bar code is wider than the minimum bar width of said predetermined basic bar widths.

25. A process for optically reading a codes comprising the steps of:
   optically reading the code by an optical device which irradiates a scanning beam onto the code and detects a reflected beam of the scanning beam, reflected from the code;
   determining whether the code and the optical device are moving relative to each other; and
   validating the data of the code when it is determined that the code and the optical device are not moving relative to each other.

26. The process for reading codes as claimed in claim 25, further comprising:
   determining that the code and the code reader are not moving, relative to each other, when a plurality of data of the code, read by the code reader, are substantially the same.

27. The process for reading codes as claimed in claim 25, further comprising:
   determining that the code and the code reader are not moving, relative to each other, when reading intervals of the plurality of data of the code, read by the code reader, are in a relationship of a multiple of an integer.

28. The process for reading codes as claimed in claim 25, further comprising:
   determining that the code and the code reader are not moving, relative to each other, when a basic pattern of the code is substantially the same basic pattern found among the plurality of data of the code read, by the code reader.

29. The process for reading codes as claimed in claim 25, further comprising:
   determining that the code and the code reader are not moving, relative to each other, when a positional relationship, between a scanning position of each of a plurality of data of the code read by the code reader and a reading position for the code, is substantially unchanged.

30. An optical device for optically reading a code, comprising;
   a light source generating a scanning beam for scanning a code;
   a detector detecting a reflected beam of the scanning beam, reflected from the code;
   a determining unit determining whether the code and the optical device are moving, relative to each other; and
   a controller validating optical reading of the code when the determining unit determines that the code and the optical device are not moving relative to each other.

31. The code reader for reading a code as claimed in claim 30, wherein the judging unit determines that the code and the code reader are not moving, relative to each other, when a plurality of data of the code, read by the code reader, are substantially the same.

32. The code reader for reading a code, as claimed in claim 30, wherein the judging unit determines that the code and the code reader are not moving, relative to each other, when reading intervals of the plurality of data of the code, read by the code reader, are in a relationship of a multiple of an integer.

33. The code reader for reading a code, as claimed in claim 30, wherein the judging unit determines that the code and the code reader are not moving, relative to each other, when a basic pattern of the code is substantially the same basic pattern found among the plurality of data of the code read by the code reader.

34. The code reader for reading a code, as claimed in claim 30, wherein the judging unit determines that the code and the code reader are not moving, relative to each other, when there exists a substantially unchanged positional relationship, between a scanning position of each of the plurality of data of the code read by the code reader and a reading position for the code.

35. The code reader for reading a code, as claimed in claim 30, wherein the judging unit performs:

a recognition function by which a code read during a transfer of the code reader is invalidated and an code read during a stationary state of the code reader is validated; and a selecting function for selecting one of a use and a non-use of the recognition function.

* * * * *

UNITED STATES PATENT AND TRADEMARK OFFICE
CERTIFICATE OF CORRECTION

PATENT NO.: 5,898,163
DATED : April 27, 1999
INVENTOR(S): Shinichi SATO et al.

It is certified that error appears in the above-identified patent and that said Letters Patent is hereby corrected as shown below:

Col. 17, line 52, after "said" (first occurrence) insert --code--;
line 58, change "codes" to --code,--.

Col. 18, line 1, after "basic" insert --pattern--;
line 54, after "said" (second occurrence) insert --judging--;
line 64, after "other," insert --when--.

Col. 19, line 16, after "which" insert --a--;
line 44, change "function," to --function--;
line 48, change "it" to --unit--;
line 60, change "codes" to --code--.

Signed and Sealed this

Fifth Day of October, 1999

Attest:

Attesting Officer

Q. TODD DICKINSON

Acting Commissioner of Patents and Trademarks